United States Patent
Wang et al.

(10) Patent No.: US 10,591,058 B2
(45) Date of Patent: Mar. 17, 2020

(54) AUTO RETURN TO PARK ROTARY AND LEVER STYLE SHIFTER

(71) Applicant: KUSTER NORTH AMERICA, INC., Troy, MI (US)

(72) Inventors: Yong Qiang Wang, Troy, MI (US); Brian Mayville, Northville, MI (US)

(73) Assignee: Kuster North America, Inc., Troy, MI (US)

( * ) Notice: Subject to any disclaimer, the term of this patent is extended or adjusted under 35 U.S.C. 154(b) by 259 days.

(21) Appl. No.: 15/910,158

(22) Filed: Mar. 2, 2018

(65) Prior Publication Data

US 2018/0259067 A1    Sep. 13, 2018

Related U.S. Application Data

(60) Provisional application No. 62/527,372, filed on Jun. 30, 2017, provisional application No. 62/469,959, filed on Mar. 10, 2017.

(51) Int. Cl.
*F16H 63/34* (2006.01)
*F16H 59/08* (2006.01)
(Continued)

(52) U.S. Cl.
CPC ......... *F16H 63/3475* (2013.01); *F16H 59/08* (2013.01); *F16H 61/22* (2013.01);
(Continued)

(58) Field of Classification Search
CPC ................. F16H 59/08; F16H 59/0278; F16H 2059/081; F16H 2059/0295;
(Continued)

(56) References Cited

U.S. PATENT DOCUMENTS

| 3,901,097 A | 8/1975 | Williams et al. |
| 5,884,528 A | 3/1999 | Ludanek et al. |

(Continued)

FOREIGN PATENT DOCUMENTS

| EP | 1946983 B1 | 2/2010 |
| EP | 3225884 A1 | 10/2017 |

(Continued)

OTHER PUBLICATIONS

International Search Report for International Application No. PCT/US2018/056685 dated Mar. 11, 2019.

(Continued)

*Primary Examiner* — Jake Cook
*Assistant Examiner* — T. Scott Fix
(74) *Attorney, Agent, or Firm* — Dinsmore & Shohl LLP

(57) ABSTRACT

A shifter assembly having a housing supporting a detent locking wheel with a biasing return spring. A plunger housing subassembly is rotatably supported within the locking wheel and operating in response to an external input to be rotated between each of Park, Reverse, Neutral and Drive gear shift positions. A solenoid is supported by the housing and is linked to a lock lever assembly pivotally engaged in the housing in proximity to the locking wheel, an extending portion of the lock lever assembly engaging the locking wheel. A PCB board is integrated into the housing and is communicable with at least one external sensor associated with a driver exit condition. Upon a triggering of the exit condition with the shifter in other than a Park position, the solenoid being energized to retract the lock lever assembly to permit the return spring to rotate said wheel to the Park position.

21 Claims, 12 Drawing Sheets

(51) Int. Cl.
*F16H 61/22* (2006.01)
*F16H 59/02* (2006.01)
*F16H 61/24* (2006.01)

(52) U.S. Cl.
CPC .............. *F16H 2059/0221* (2013.01); *F16H 2059/081* (2013.01); *F16H 2059/085* (2013.01); *F16H 2061/223* (2013.01); *F16H 2061/247* (2013.01)

(58) Field of Classification Search
CPC ......... F16H 2061/241; F16H 2061/243; F16H 2061/245; F16H 2061/247; F16H 2061/026; F16H 2061/223; F16H 2061/226; F16H 61/22; F16H 61/24; F16H 61/0204; F16H 61/0006; B60K 37/06; Y10T 74/2014; Y10T 74/20098; Y10T 74/20128; Y10T 74/1418; Y10T 74/1424; H01H 19/16; G05G 5/02; G05G 5/03; G05G 5/04; G05G 5/06; G05G 5/065; G05G 5/08
USPC .................. 74/473.21, 0.23, 24, 25, 26, 28
See application file for complete search history.

(56) References Cited

U.S. PATENT DOCUMENTS

| | | | |
|---|---|---|---|
| 5,919,112 A | 7/1999 | Michael et al. | |
| 6,059,687 A | 5/2000 | Durieux et al. | |
| 6,151,977 A | 11/2000 | Menig et al. | |
| 6,295,887 B1 | 10/2001 | DeJonge et al. | |
| 6,564,661 B2 | 5/2003 | DeJonge | |
| 6,806,810 B2 | 10/2004 | Robinson | |
| 6,834,563 B2 | 12/2004 | Seekircher | |
| 7,028,575 B2 | 4/2006 | Ehrmaier et al. | |
| 7,571,662 B2 | 8/2009 | Pickering et al. | |
| 7,770,486 B2 | 8/2010 | Morita et al. | |
| 7,913,583 B2 | 3/2011 | Reppuhn et al. | |
| 8,170,757 B2 | 5/2012 | Furhoff et al. | |
| 8,264,338 B2 | 9/2012 | Leon | |
| 8,336,424 B2 | 12/2012 | Miret et al. | |
| 8,485,061 B2 | 7/2013 | Kliemannel et al. | |
| 8,490,509 B2 | 7/2013 | Giefer et al. | |
| 8,897,978 B2 | 11/2014 | Fyie et al. | |
| 9,239,108 B2 | 1/2016 | Ganter et al. | |
| 9,334,949 B2 | 5/2016 | Fett et al. | |
| 9,400,049 B2 | 7/2016 | Heo et al. | |
| 9,529,378 B2 | 12/2016 | Jeon | |
| 2002/0152827 A1 | 10/2002 | Hayashi et al. | |
| 2003/0029261 A1 | 2/2003 | DeJonge | |
| 2006/0053930 A1 | 3/2006 | Morita et al. | |
| 2009/0000413 A1 | 1/2009 | Furhoff et al. | |
| 2009/0107287 A1 | 4/2009 | Seki | |
| 2013/0305865 A1* | 11/2013 | Howe | F16H 61/12 74/473.12 |
| 2014/0007726 A1 | 1/2014 | Muraki et al. | |
| 2014/0224056 A1 | 8/2014 | Beaufils | |
| 2014/0345409 A1 | 11/2014 | Watanabe | |
| 2015/0027861 A1 | 1/2015 | Hoskins et al. | |
| 2015/0135878 A1 | 5/2015 | Park et al. | |
| 2015/0143938 A1 | 5/2015 | Swaita et al. | |
| 2015/0152958 A1 | 6/2015 | Watanabe et al. | |
| 2015/0167827 A1 | 6/2015 | Felt et al. | |
| 2015/0167829 A1 | 6/2015 | Kim | |
| 2015/0266376 A1 | 9/2015 | Tokumo et al. | |
| 2015/0274170 A1 | 10/2015 | Sun | |
| 2015/0369358 A1 | 12/2015 | Lee et al. | |
| 2016/0312882 A1* | 10/2016 | Heo | F16H 59/08 |

FOREIGN PATENT DOCUMENTS

| | | |
|---|---|---|
| GB | 1484146 A | 8/1977 |
| GB | 1489898 A | 10/1977 |
| GB | 1489899 A | 10/1977 |
| JP | 2007-186118 A | 7/2007 |

OTHER PUBLICATIONS

International Search Report for International Application No. 16KNAI10680WO dated Mar. 11, 2019.

* cited by examiner

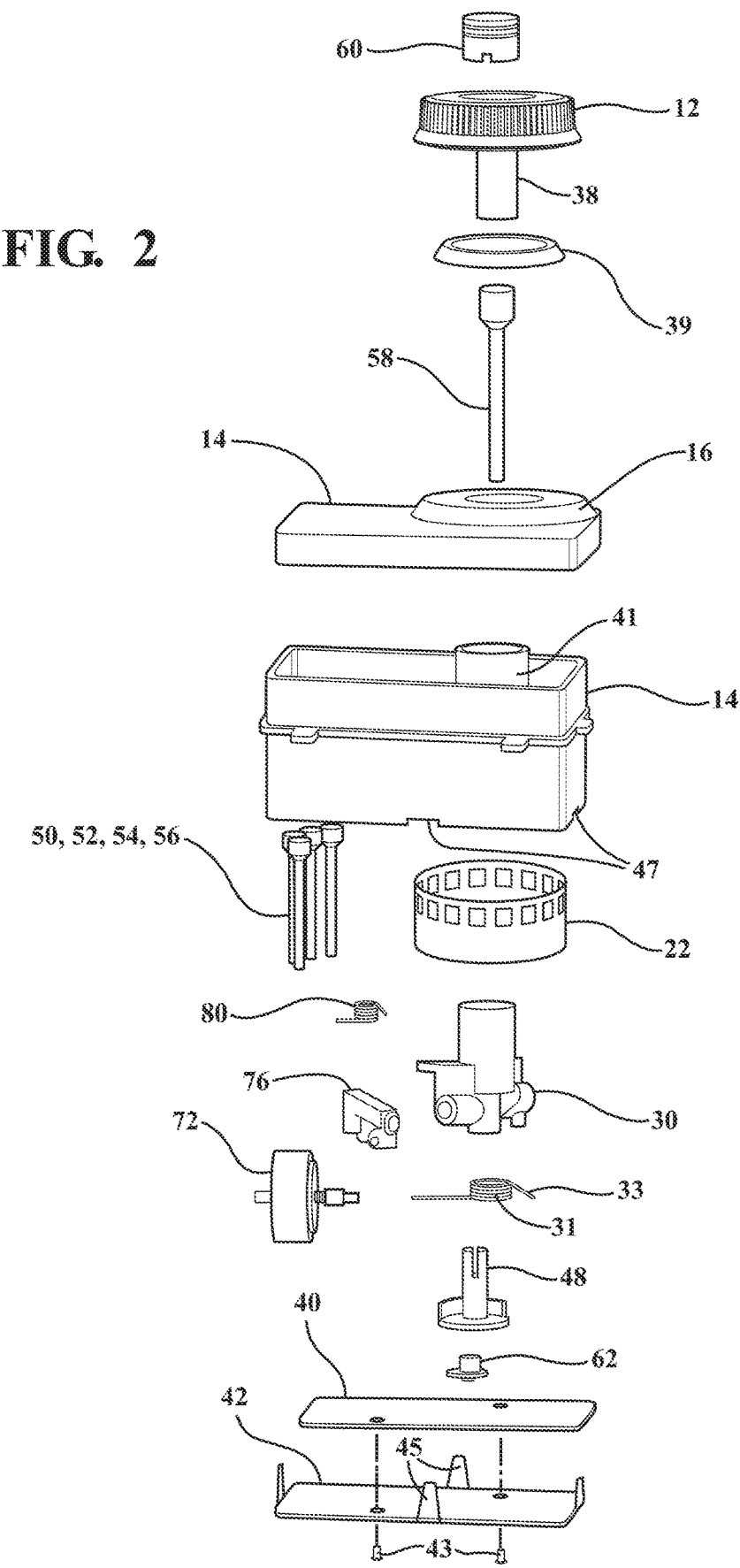

AUTO RETURN TO PARK ROTARY AND LEVER STYLE SHIFTER

CROSS REFERENCE TO RELATED APPLICATIONS

The present application claims the priority of U.S. Ser. No. 62/527,372 filed Jun. 30, 2017, as well as U.S. Ser. No. 62/469,959 filed Mar. 10, 2017.

BACKGROUND OF THE INVENTION

Field of the Invention

The present invention discloses each of rotary and lever style shifters which can shift between each of Park, Reverse, Neutral, Drive and Sport positions (the latter providing higher RPM at lower speeds for such as performance driving conditions) As will be further described below, the present design incorporates a solenoid for selectively locking and controlling rotation of a detent locking wheel which in turn establishes both controlled shifting between the PRND positions as well as automatic return to park functionality.

Description of the Background Art

The prior art is documented with examples of sensor activated linkage for establishing a return to Park condition (both associated with rotary and linear shifter assemblies). Examples of these most notably include each of Swaita, USSN 2015/0143938, disclosing default-to-par, having output member, rotatable plate, latching mechanism and biasing member), Watanabe, USSN 2015/0152958 teaching a motor driven device with control circuit for moving a rotary detent member to park, and Ehrmaier, U.S. Pat. No. 7,028,575 further disclosing a shift lever with dual shifting channels such that manual deflection in either channel, following release, effectuates monostable return to park functionality.

Additional examples of motorized sifter assemblies include each of Fett, U.S. Pat. No. 9,334,949, Ganter, U.S. Pat. No. 9,239,108 and Rake, U.S. Pat. No. 9,518,650 among others. Other gear selector devices also include each of Fuhroff, USSN 2009/0000413, Giefer, U.S. Pat. No. 8,413,536 and Seki, U.S. Pat. No. 8,359,943.

SUMMARY OF THE PRESENT INVENTION

The present invention discloses each of rotary and lever style shifters which can shift between each of Park, Reverse, Neutral, Drive and Sport positions (the latter providing higher RPM at lower speeds for such as performance driving conditions) As will be further described below, the present design incorporates a solenoid for selectively locking and controlling rotation of a detent locking wheel which in turn establishes both controlled shifting between the PRND positions as well as automatic return to park functionality.

Engagement between the solenoid and the detent locking wheel occurs via a pivoting lock lever assembly, such mounted to the housing, which is slaved to the solenoid, a lock plunger projecting from the lever assembly and such that, in a de-energized solenoid condition, the lock plunger engages a selected aperture location of the detent locking wheel. A collection of biasing springs includes a torsional spring for biasing the detent locking wheel relative to the outer housing, and which is provided with a first extending spring leg locked to the package supporting housing and an opposite spring leg biasing a circumferential location of the ratchet wheel.

In a normal shifting operation, the torsional (or return) spring is loaded between the detent locking wheel and housing and will cause the affixed knob to be stopped by the housing at the Park and Drive positions, shifting effort being generated by a pair of steel balls biased by coil springs integrated into extending portions of the plunger housing subassembly and which are guided within inner perimeter extending detent surfaces in the outer fixed housing. This occurs concurrent with the adjustable torsional spring leg being continuously repositioned (pushed over) adjoining ratchet teeth formed within an underside surface of the detent locking wheel.

The lock lever assembly, slaved to the solenoid, is pivotally mounted to the housing and biased by a further torsional spring in a direction towards the detent locking wheel. The lock plunger is in turn supported upon the lock lever in a limited pivoting fashion via a smaller and tertiary spring and, in combination with a catch ledge configured into a forward most edge of the lock plunger, provides a limited range of motion between projecting/engaged and retracted/released positions relative to a selected circumferentially arrayed window associated with the outer annular wall of the detent locking wheel, and further so that the step prevents the lock plunger from retracting beyond a distance necessary to afford spring biased return to park rotation of the detent locking wheel.

A PCB board and related sensor are arranged in communication with a magnet mounted to an underside of a magnet holder integrated into the plunger housing subassembly. Rotation of the knob between each of the gear positions results in an arcuate sweeping motion of the magnet relative to the sensor on the PCB and, upon the sensor detecting the position of the magnet, confirming resetting of the Park position. This is controlled by the relative rotation between the knob and the end stopper which occurs upon the energization of the solenoid to a release/retracted position relative to the detent locking wheel (again via the lock plunger and pivoting lock lever assembly), at which the torsional spring counter rotates the stopper to the Park position.

The Park lock function further describes standard BTSI (brake transmission system interlock) functionality, which mechanically locks the shifter knob in the Park position unless the driver presses the brake pedal before shifting to any of the R, N and D positions. The BTSI aspect is integrated into the PCB to solenoid communication protocol of the design, additionally and apart from its return to park features.

A plurality of extraneous vehicle sensors are arranged throughout the vehicle in communication with the solenoid for determining a Park reset triggering condition, such determined to occur by the driver unlatching the seatbelt, exiting the vehicle by opening the door, etc., with the vehicle in gear. Once one of these conditions has been met, the given sensor instructs the solenoid to retract the lock plunger from engagement with the outer toothed location of the detent locking wheel in an energized/released condition.

Once the new Park position is established, and as confirmed by the proximity condition established between the magnet and holder via the PCB mounted sensor (such as which is understood further to be any suitable type of inductive or magnetic Hall effect sensor), the solenoid is once again de-energized in order to reengage the detent locking wheel.

In this manner, both the BTSI and return to park functionality are integrated into a simplified design consisting of a single solenoid, detent locking wheel, return torsional spring and interposed lock lever which are incorporated into the biased plunger housing subassembly and so that the plunger provides for normal shifting operation, with the detent locking wheel operating in combination with the solenoid and lock plunger to provide return to park functionality.

BRIEF DESCRIPTION OF THE DRAWINGS

Reference will now be made to the attached illustrations, when read in combination with the following detailed description, wherein like reference numerals refer to like parts throughout the several views: and in which:

FIG. 2 is an exploded view of the rotary shifter package with auto return to park and park lock functionality according to one non-limiting variant of the present invention;

DETAILED DESCRIPTION OF THE PREFERRED EMBODIMENTS

Figure 8:
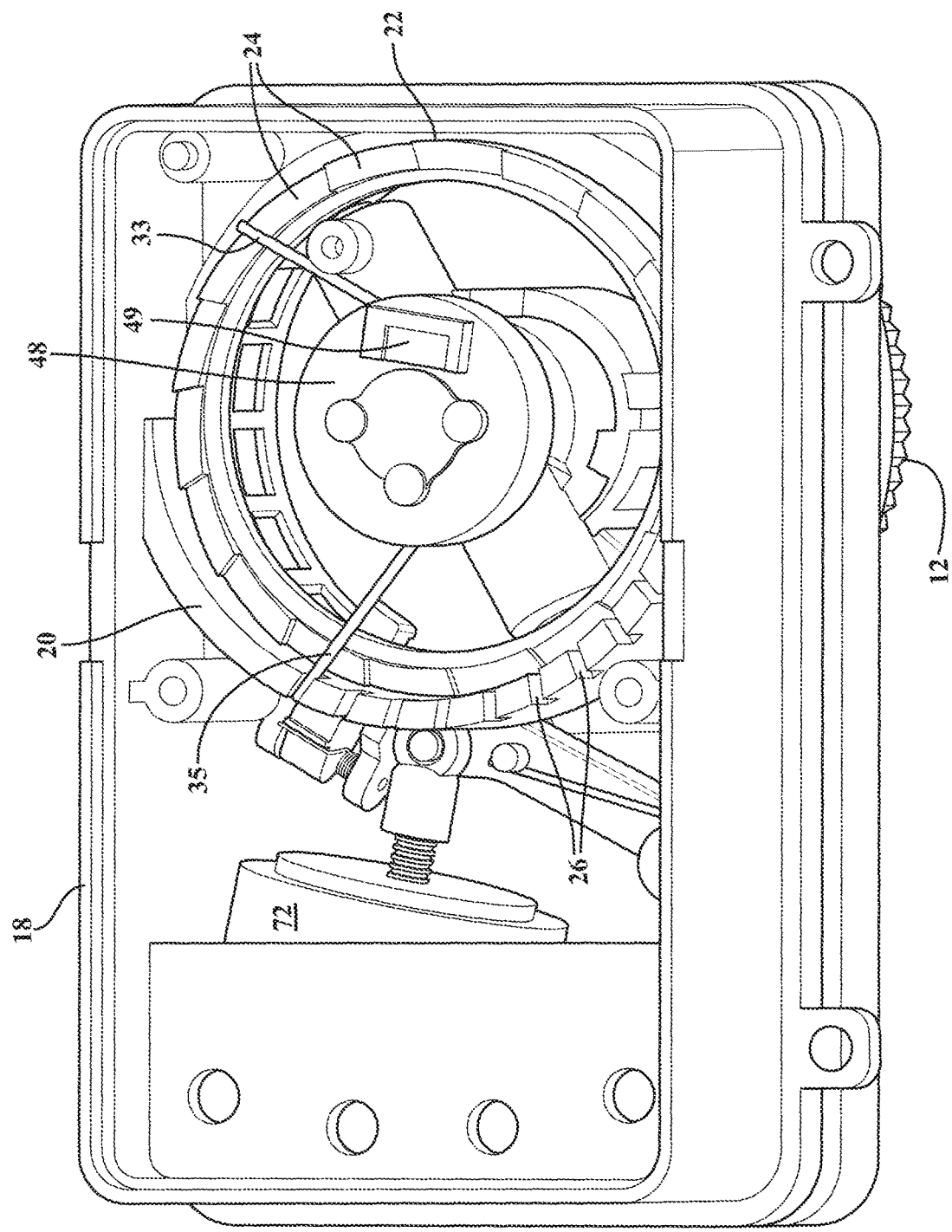
FIG. 8 is a succeeding illustration to FIG. 7 and depicting the other torsional spring leg locked against an outer circumferential underside toothed location of the housing surrounding the detent locking wheel for enabling ratchet style adjustment between each of the PRND positions.
Figure 9:
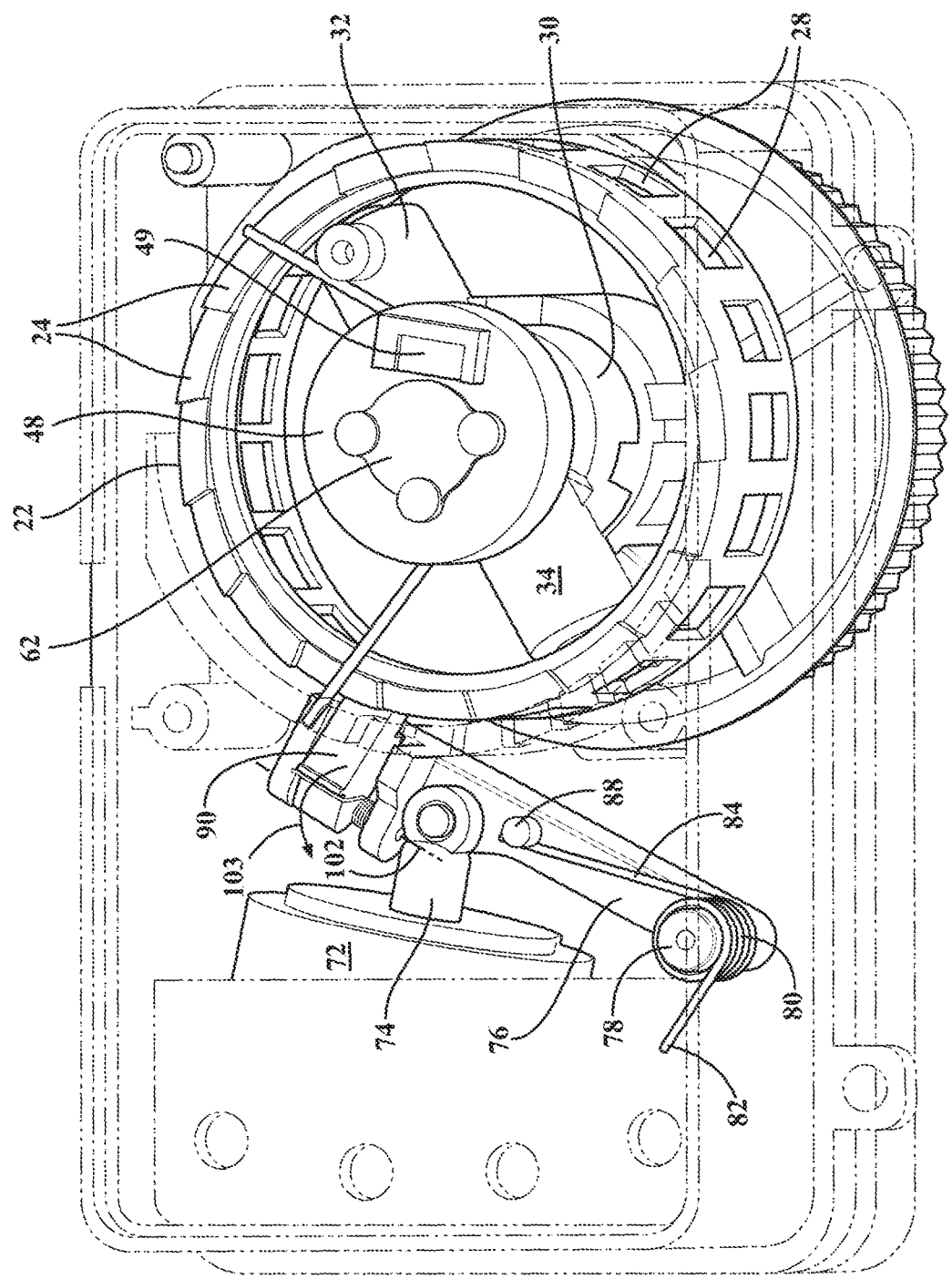
FIG. 9 is a further illustration, similar to each of FIGS. 3, 5 and 7, depicting the lock plunger in a fully retracted position resulting in release of the detent locking wheel and rotation of the wheel together with the knob to the Park position.
Figure 10:
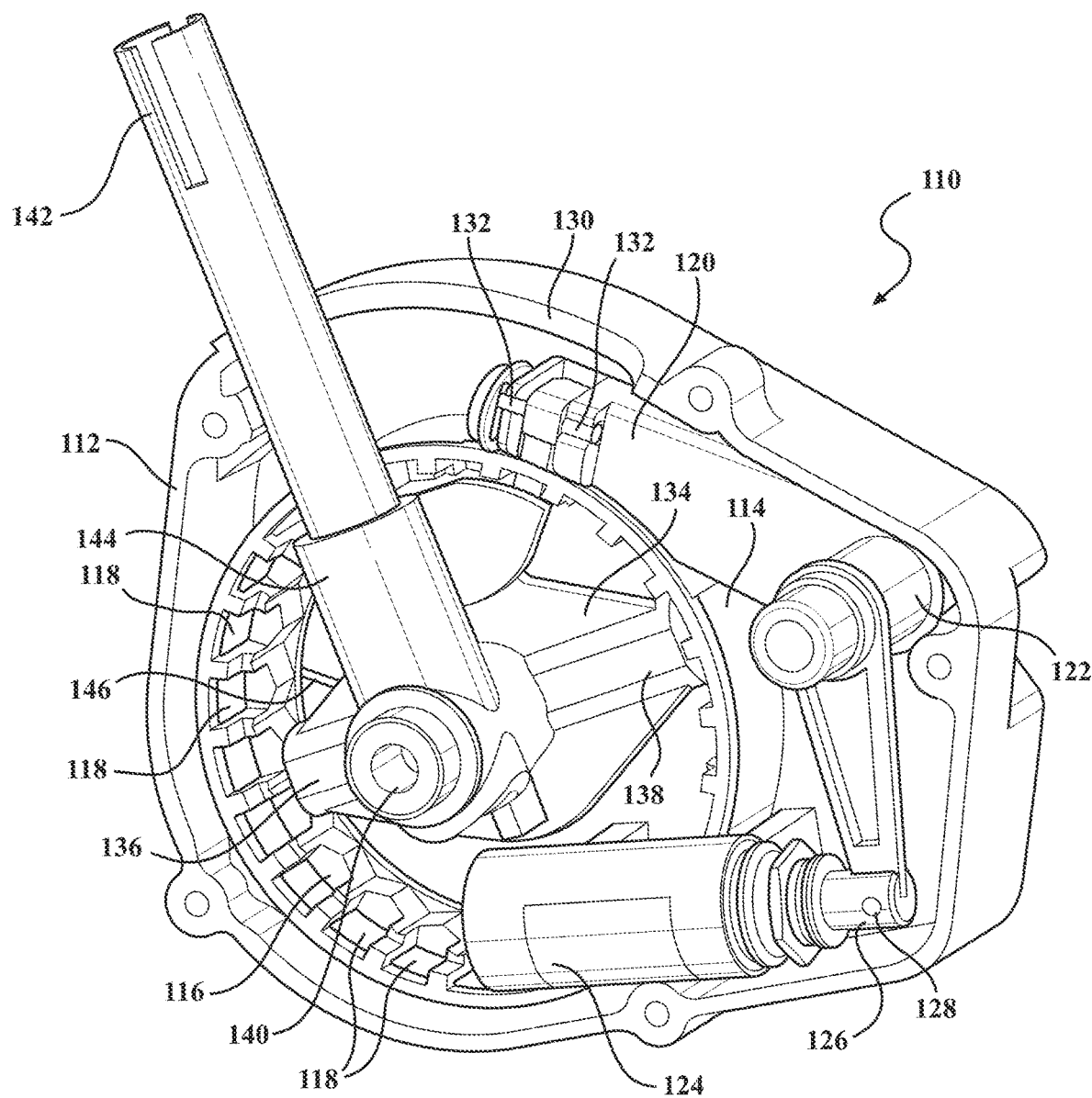
FIG. 10 is an illustration of a lever style shifter according to a further embodiment and which includes a reconfiguration of each of the shifter housing, plunger housing subassembly, lock lever assembly and solenoid assembly.

With reference now to FIGS. 1-9, the present invention discloses a rotary shifter with auto return to park and park lock functionality. FIG. 10 further illustrates a second lever style version of the shifter package according to another non-limiting variant of the present invention, and which again provides both auto return to park and park lock features.

Referring first to FIGS. 1A-1D, illustrated are a series of perspective, top, side and end views of a package housing, generally at 10, associated with a rotary shifter according to a first embodiment of the present invention, and depicting a rotary knob 12 which can shift between each of Park, Reverse, Neutral, and Drive gear positions. The shifter assembly includes a main package defining and three dimensional rectangular shaped housing 14 over which is attached a bezel cover 16, and within which is depicted each of the PRND positions. Although not clearly shown, the bezel cover further includes an annular opening defined within and which provides a receiving access to the features of the rotary knob subassembly as will be further described.

Figure 7:
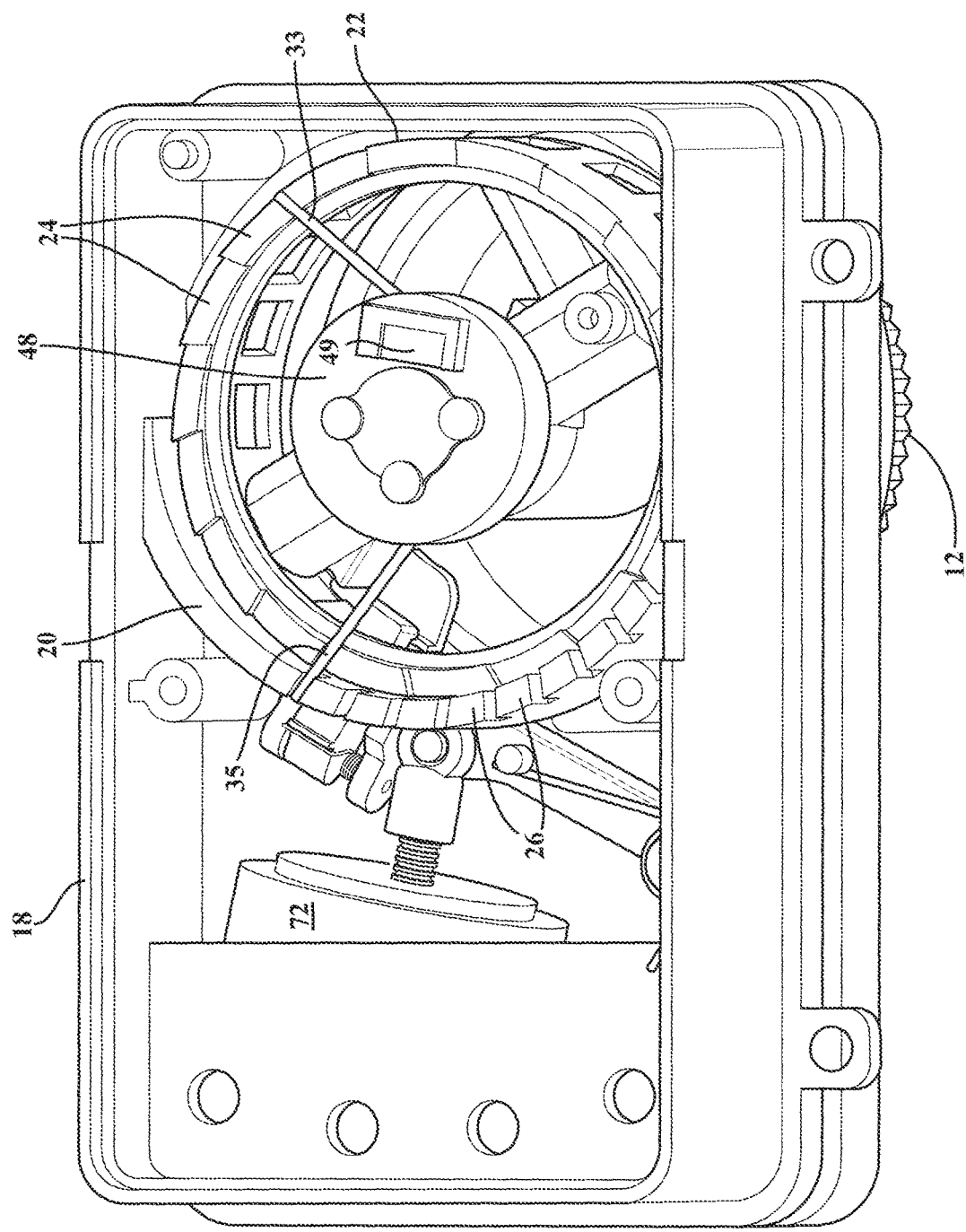
FIG. 7 is a further succeeding illustration of the mechanism from an underside perspective in the position as substantially shown in FIG. 5 (solenoid on and partially retracted) and depicting a first torsional spring leg positioned against a circumferential underside ratchet teeth location associated with the detent locking wheel.

The package housing 14, best depicted in the solid underside rotated views of FIGS. 7-8, includes an open interior having a cavity (see at 18) for supporting the solenoid and lock lever assemblies as will be described in further detail below. A circumferentially extending inner extending divider wall is shown at 20, segregated to a side of the main housing 14, and which separates the solenoid and lock lever assembly supporting cavity from a further inner cavity defined by a receiving profile for receiving a sleeve shaped detent locking wheel 22. The locking wheel 22 underside is configured with a circumferential array of serrated or angled edge locations 24, these being in the form of successive extending ramps and being arranged coaxially interiorly relative to a surrounding plurality of recessed seating locations arranged in alternating fashion with a plurality of teethed portions 26 which are configured in the outer coaxial and circumferential end surface profile of the divider wall 20 (see in particular FIGS. 3, 5, 7 and 8). As best shown in each of FIGS. 3-6, a plurality of window defining apertures 28 are configured in circumferential spaced fashion through the annular side wall of the detent locking wheel 22, these for engaging the lock lever assembly plunger as will be subsequently described.

As will be further described, the circumferential overlapping arrangement of the outer coaxial teethed portions 26 and inner ramped 24 surfaces establishes a plurality of successive ratchet teeth, these controlling successive rotation of the knob 12 and plunger housing subassembly, via an interposed torsional spring 31. A generally cylindrical shaped plunger housing is depicted at 30 associated with the rotary knob 12 subassembly is provided and includes a pair of lower and opposite and radial projecting guiding portions 32 and 34, these being interiorly hollowed for receiving a pair of opposing steel balls (one of which is shown at 36 in FIG. 4) and supporting detent springs (such being coil springs which are installed within the open ends of the radial projecting and guiding portions and which bias the bearings or balls outwardly from the open ends of the portions 32/34, it being further understood that the diameter of the open ends of the radial plunger housing portions are sized to permit a minor portion of the bearings to project outwardly from the open ends, with the largest diameters being retained in an inner annular edge contact with interior of the portions). Although not clearly shown, the radial projecting guiding portions 32 and 34 align with an inwardly facing detent profile associated with the detent wheel interior, the outwardly influenced steel balls supported within the open interior of the radial portions interacting in tactile induced fashion with the detent profile edges defined within the detent wheel in order to establish guided rotation of the knob 12.

A torsional return spring 31 (see FIG. 2) includes a first extending leg 33 (see FIG. 7) biased against the underside ramped ratchet teeth 24 of the detent locking wheel, with a second extending leg 35 (FIG. 8) engaged to a recessed location of the circumferential underside seating profile which is situated between successive teethed locations 26. As will be further described, the return spring enables selected controlled adjustment between the PRND positions (such as when the brake pedal is depressed and the Park lock or BTSI function is disabled, with spring operating in concert with the solenoid, lock plunger and detent locking wheel in an automatic return to park situation as instructed by the exterior sensors and PCB.

The rotary knob 12 includes an extending shaft or stem portion 38 receiving an underside knob seal 39 affixing within an open upper rim interior 41 of the plunger housing 12. Upon the bezel cover 16 being mounted atop the main packaging housing 12, and the plunger housing 30 being mounted through the bezel cover opening 16 and into the main package housing 12 (with the knob underside ledge surrounding the seal supported upon the annular rim of the bezel cover and surrounding the opening, the radial projecting portions 32/34 are received coaxially within the circumferential stepped underside profile 26 of the housing align with the inwardly facing detent profile surfaces to facilitate tactile engagement of the knob 12 and plunger housing 30.

As further shown in FIG. 2, a printed circuit board (PCB) 40 is located at the generally bottom of the package interior, secured by screws (not shown) with a bottom cover 42 supported underneath the PCB 40, and which in turn mates with an underside outer rectangular rim edge (see also at 44 in FIG. 3) of the main housing 12. A plurality of outer and upwardly projecting tabs 45 extend from the edges of the bottom cover 42 and seat within receiving windows 47 configured into the lower edge side and end walls of the main housing body to assist in assembling the package together. Separate screws 43 can be provided for extending through aligning mounting apertures in the PCB 40 and the bottom cover 42 (see again FIG. 2) to assist in assembling together the package housing. As further shown, the outer package housing 14 can include peripheral mounting tabs or portions extending in spaced apart fashion around the main housing (see at 46 in FIG. 1B) for mounting the overall assembly within a vehicle environment.

An underside surface of the plunger housing 30 integrates a magnet holder 48 such containing a magnet 49 within a hidden underside thereof and which, upon rotating the plunger housing 30 relative to the main package housing 14 and as guided by the internal detent profile (coaxial surfaces 24 and 26), causes the magnet 49 to travel in an arc motion relative to the PCB mounted sensor, resulting in adjustment of a magnetic field sensed by a position sensor within the PCB board 40, such as which is understood further to be any suitable type of inductive or magnetic Hall effect sensor, in order to detect a rotated knob position.

A plurality of light pipes are provided and include each Park, Reverse, Neutral and Drive gear position light pipes, see at 50, 52, 54 and 56 in FIG. 2. A Sport gear position light pipe is further shown at 58 in combination with a surface "S" button fitting 60 integrated into the knob 12 and a further "S" button push pad 62 located at a bottom end of the "S" gear position light pipe 58.

Figure 1A:
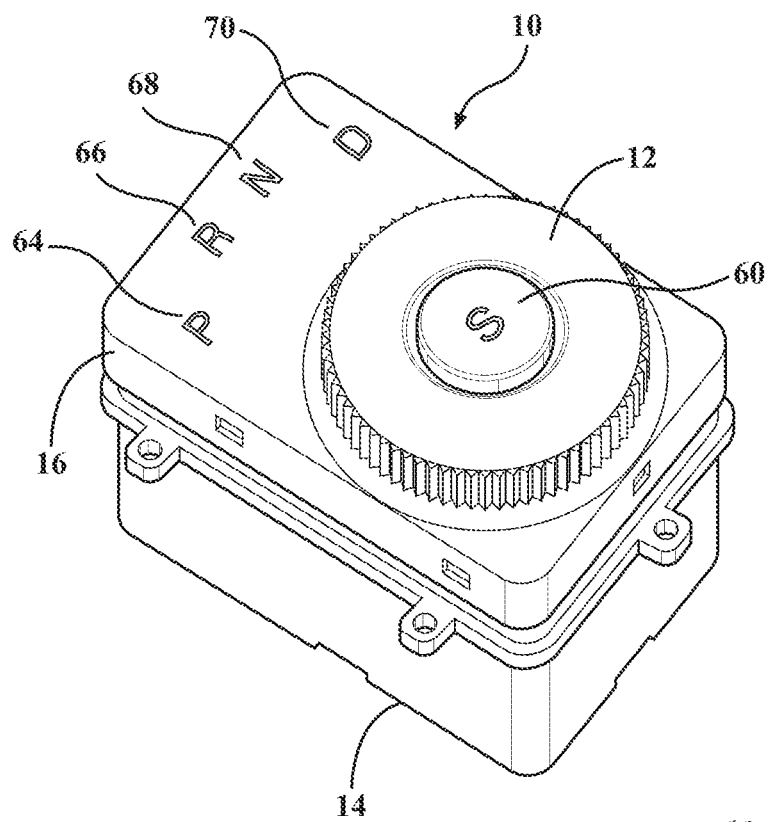
FIGS. 1A-1D present a series of perspective, top, side and end views of a package housing associated with a rotary shifter according to a first embodiment of the present invention and depicting a rotary knob which can shift between each of Park, Reverse, Neutral, and Drive gear positions.
Figure 1B:
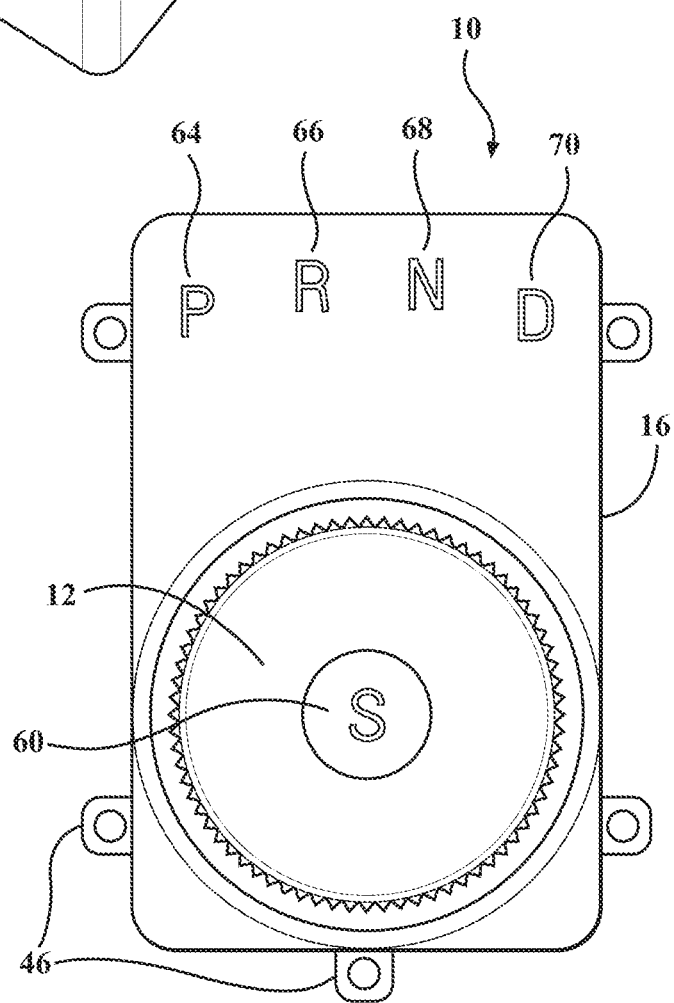
Figure 1C:
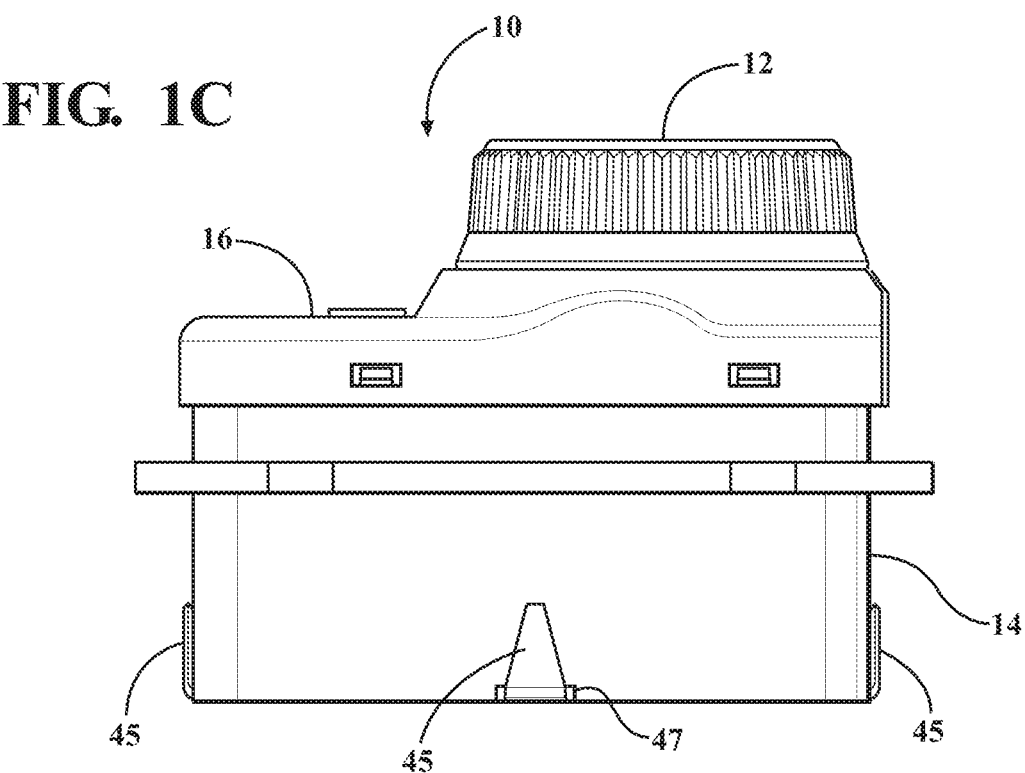
Figure 1D:
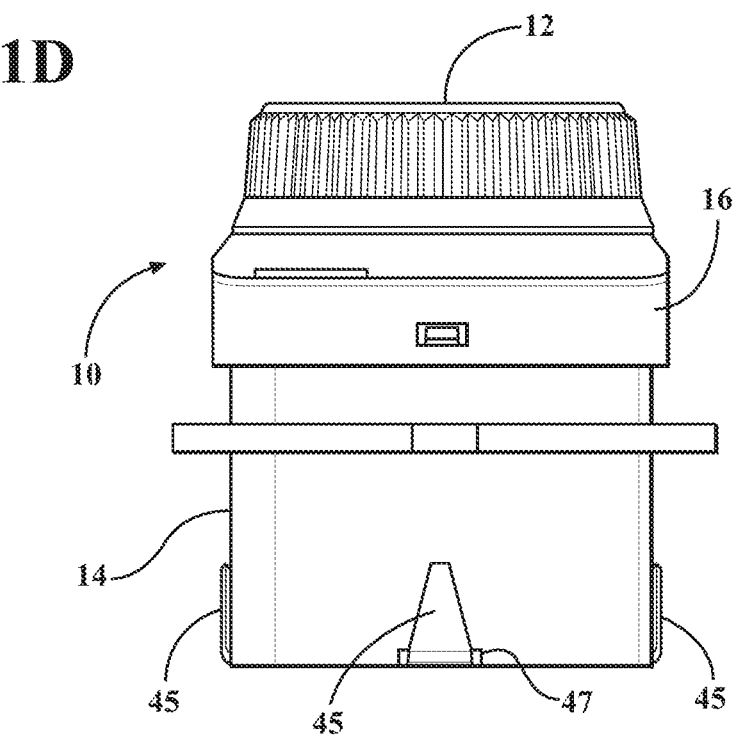
Figure 2A:
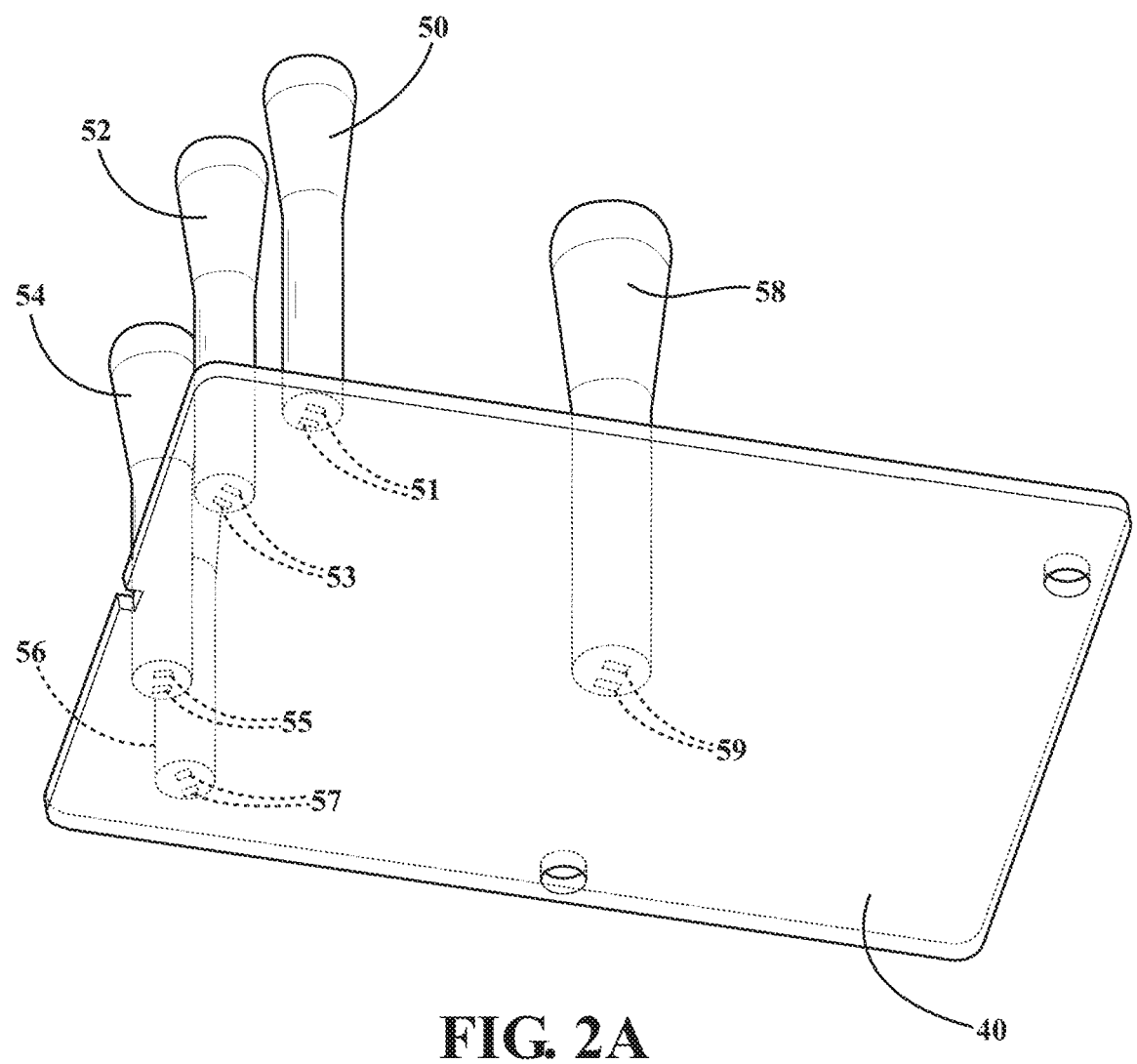
FIG. 2A is an underside perspective of the PCB board, light pipes and pairs of LED elements.

Each of the light pipes 50-58 (FIG. 2) are supported within the package housing so that bottom open ends are in communication with individual pairs of LED's (see further at 51, 53, 55, 57 and 59, respectively for lights pipes 50, 52, 54, 56 and 58 in the underside perspective of FIG. 2A) integrated into the PCB board 44. The pairing of the LED's provides one each for backlighting and gear indication respectively for each shifter position. Reference is also made to the illuminating RNDS locations (see at 64, 66, 68 and 70) formed into the top bezel cover 16 in FIGS. 1A-B and in addition to the "S" position designated on button 60 seated within the inner annular aperture profile of the knob 12.

The present design incorporates a solenoid assembly, see at 72, which as previously indicated is supported within the interior of the housing 14 adjacent to the circumferential seating profile 26 for supporting the detent locking wheel 22. The solenoid 72 is provided with power from an external force and includes a linear extending (and power retracting) portion 74 which is engaged to a location 75 of an elongated and irregular shaped lock lever assembly 76, this in turn pivotally supported at a location 78 to an interior location of the main package housing 14.

Figure 3:
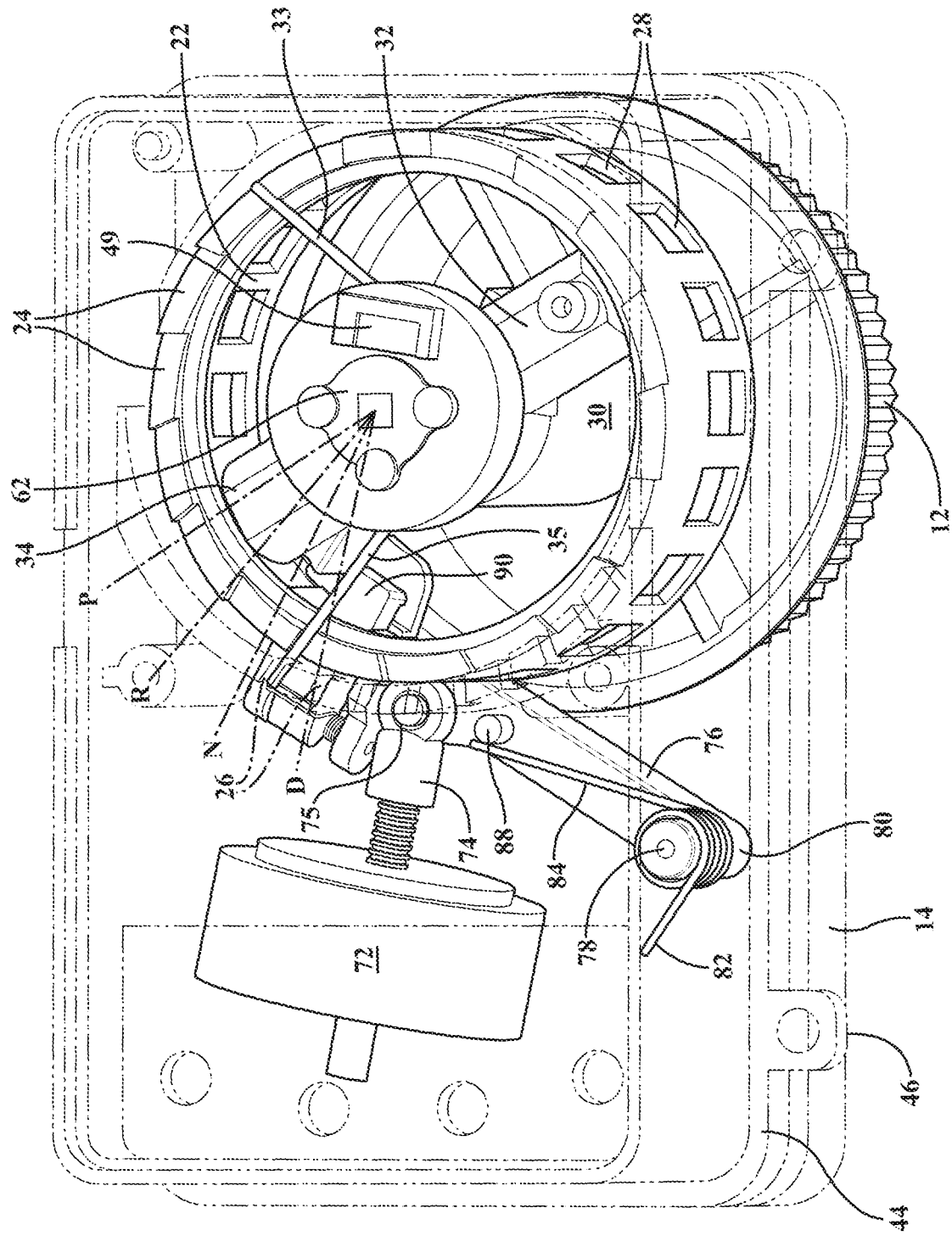
FIG. 3 is an underside rotated perspective of the fixed position rotary shifter and depicting the features of the detent locking wheel engaged by the solenoid and lock lever/lock plunger assembly with the Park lock (BTSI) function engaged.
Figure 4:
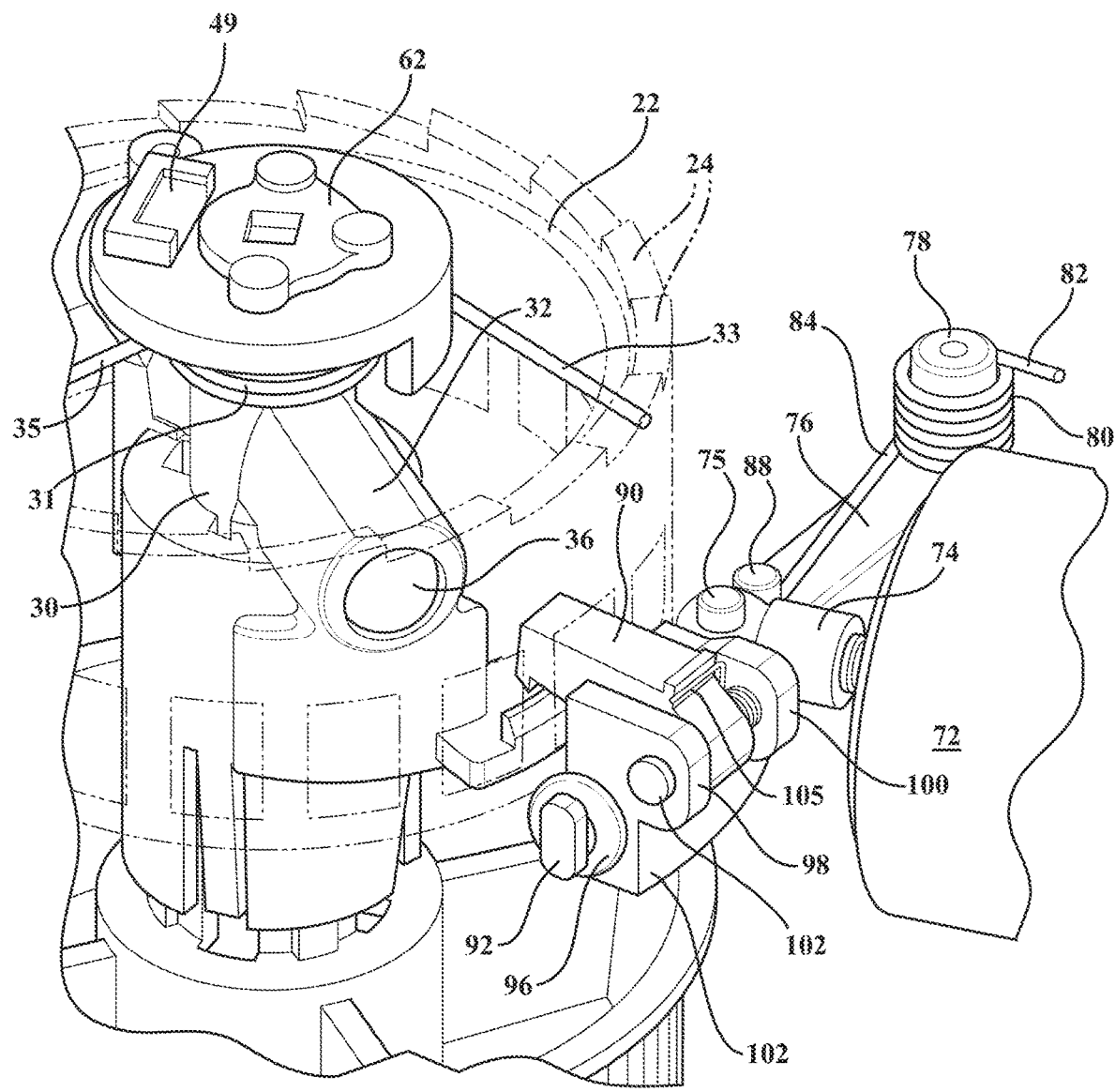
FIG. 4 is a further enlarged and rotated perspective view of the lock lever assembly including lock plunger engaged within a circumferentially arrayed window portion of the detent locking wheel, in turn torsionally spring biased in ratchet fashion to the main housing body.
Figure 5:
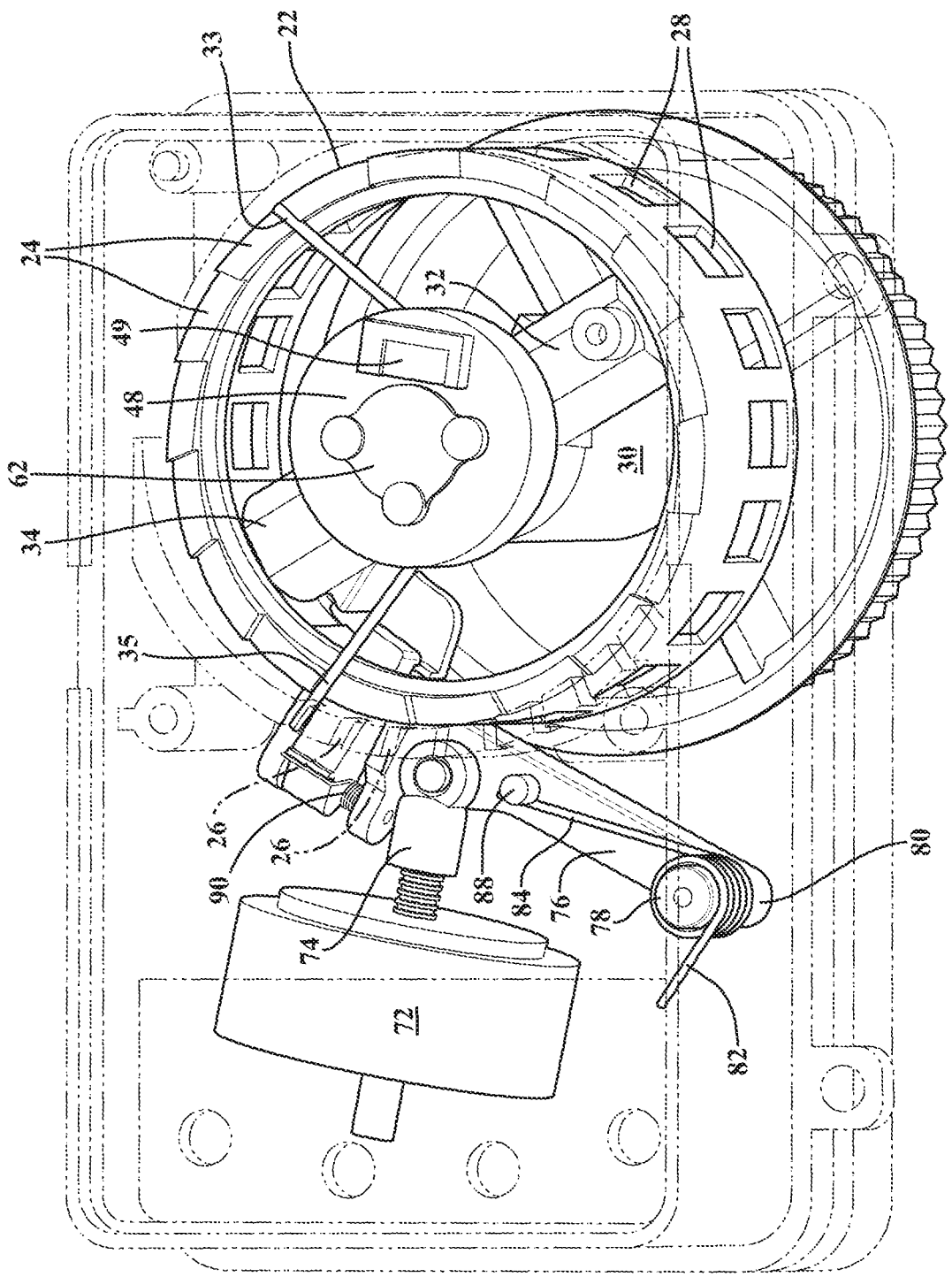
FIG. 5 is an illustration similar to FIG. 3 of the solenoid energized in a retracting and partially unlocking position relative to the detent locking wheel, permitting the plunger housing to be rotated out of the Park position.
Figure 6A:
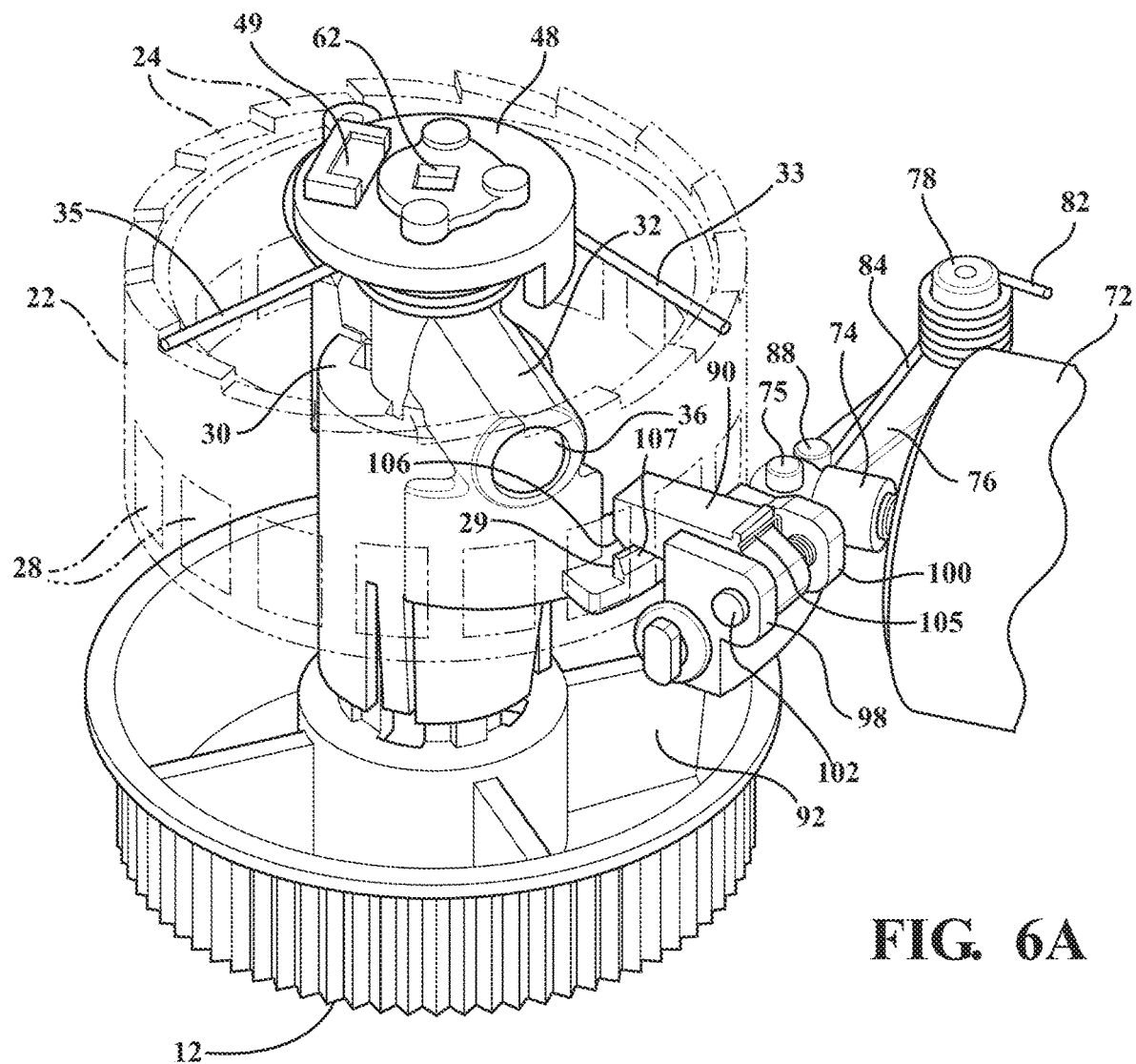
FIG. 6A is a further rotated and partial perspective view with the detent locking wheel in partially transparent illustration still locked by the lock plunger and FIG. 6B is an enlarged perspective of the lock plunger.
Figure 6B:
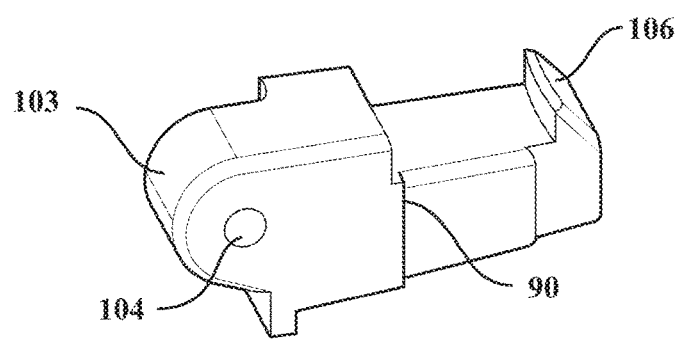

A torsion spring 80 (see as bests shown in FIGS. 3-4) is mounted to the annular pedestal shape defining the pivotal supporting location 78 of the lock lever assembly, such that a first leg 82 of the spring biases against an interior abutting location of the housing 14 and a second leg 84 against a projecting location 88 of the lock lever assembly 76 in order to bias the same in a direction towards the detent locking wheel 22 (see also directional arrows in FIGS. 3 and 5). The lock lever assembly includes a lock plunger 90 (see as best shown in FIGS. 4-6) which is received at an extended location of the lock lever assembly 76 positioned between the inner pivoting end 78 and a remote extending end 92 (see FIG. 4). A noise damper O-ring 96 is further provided on the extending end 92 of the lock lever assembly 76.

As best shown in FIG. 4, the lock plunger 90 is received between a pair of crosswise projecting shoulders 98 and 100 configured upon the lock lever assembly 76 and which define a pin inserting crosswise pivot axis 102. The lock plunger 90, again in FIGS. 6A and 6B, includes a rounded 103 base profile with aperture 104 for seating the pin associated with the pivot axis 102. Limited pivoting of the lock plunger 90 relative to the lock lever assembly 76 is facilitated by a secondary spring 105 (again FIG. 4). The lock plunger 90 includes an outermost projecting edge abutment 106 and, as will be described, is retained in contact with an edge (at 107 in FIG. 6A) of a selected perimeter window 28 of the detent locking wheel 22, following partial retraction from the fully Park position locked position (FIGS. 3-4) in which the lock plunger restrains both the detent locking wheel 22 and the plunger housing subassembly 30, to an intermediate retracted position (FIGS. 5-8) in which the plunger subassembly 30 is released for controlled shifting against the still fixed detent locking wheel 22 via the partial engaging position of the lock plunger 90 (with extending lip edge or step 106 gripping the projecting edge location 107 as again shown in FIG. 6A of the detent locking wheel window) and, finally, (FIG. 9) with the lock plunger 90 pivoted against the crosswise pivoting holding force of the tertiary spring 105 for permitting the plunger lip edge 106 to release from the detent locking wheel window 28 in a return to park reset condition.

Engagement between the solenoid 72 and the detent locking wheel 22 occurs via the pivoting lock lever assembly 76 (mounted to the housing again at 78) and which is slaved to the solenoid. The lock plunger 90 projects from the lever assembly 76 such that, in a de-energized solenoid condition (FIGS. 3-4), the lock plunger 90 engages a selected aperture location 28 of the detent locking wheel 22. In a normal shifting operation, the torsional (return) spring 31 is loaded between the detent locking wheel 22 (via extending spring leg 33 in FIG. 7) and housing 14 (via extending spring leg 35 in FIG. 8) and will cause the affixed knob 12 to be stopped by the at the Park and Drive positions, shifting effort being generated by the pair of steel balls 36 biased by the internal coil springs integrated into extending portions 32/34 of the plunger housing subassembly 30, and which are guided within inner perimeter extending detent or toothed surfaces defined by the coaxially supporting outer profile 26 in the outer fixed package housing. This occurs concurrent with the adjustable torsional spring leg 33 being continuously repositioned (pushed over) adjoining the adjoining ramped ratchet teeth 24 formed within the underside surface of the detent locking wheel 22.

The lock lever assembly 76, again slaved to the solenoid 72, is pivotally mounted to the housing 14 and biased by the further torsional spring 80 in a direction towards the detent locking wheel 22 (again FIG. 3). The lock plunger 90 is in turn supported upon the lock lever assembly 76 in the limited pivoting fashion via the smaller and tertiary spring 105 (FIG. 4) and, in combination with the catch ledge 106 configured into the forward most edge of the lock plunger, provides the limited range of motion between projecting/engaged (FIGS. 3-4) and partially retracted/released (FIGS. 5-8) positions relative to a selected circumferentially arrayed window 28 associated with the outer annular wall of the detent locking wheel 22, and further so that this outer ledge or step 106 prevents the lock plunger 90 from retracting beyond a distance necessary to afford spring biased return to park rotation of the detent locking wheel 22. FIG. 9 represents the lock plunger 90 fully disengaged from the detent locking wheel 22 (such as upon deflection of the lock plunger 90 about the crosswise pivot axis 102 of FIG. 4 and against the holding force of the tertiary spring 105 (see also directional arrow 103 of the lock plunger 90 about pivot 102) and in order to allow the wheel 22 to rotated the knob/plunger back to the Park position.

The PCB board 40 and related sensors are arranged in communication with the arcuately and rotatably displaceable magnet 49 (see again as shown in each of succeeding underside views of FIGS. 3-9) and outer holder 48. Travel of the magnet holder 48 and off center and arc motion supported magnet 49, relative to the sensor supported upon the PCB 40, confirms resetting of the Park position and is controlled by the relative rotation between the knob 12 and the end stopper, which occurs upon the energization of the solenoid 72 to cause the lock lever 76 and lock plunger 90 to a release/retracted position relative to the detent locking wheel (again via the lock plunger and pivoting lock lever assembly), at which the torsional spring 31 counter rotates the assembly to the Park position.

As previously described, the Park lock function further describes standard BTSI (brake transmission system interlock) functionality, which mechanically locks the shifter knob 12 in the Park position unless the driver presses the brake pedal before shifting to any of the R, N and D positions. The BTSI aspect is integrated into the PCB 40 to solenoid communication protocol of the design, additionally and apart from its return to park features.

A plurality of extraneous vehicle sensors are arranged throughout the vehicle in communication with the solenoid for determining a Park reset triggering condition, such determined to occur by the driver unlatching the seatbelt, exiting the vehicle by opening the door, etc., with the vehicle in gear. Once one of these conditions has been met, the given sensor instructs the solenoid to retract the lock plunger from engagement with the outer toothed location of the detent locking wheel in an energized/released condition.

Once the new Park position is established, and as confirmed by the proximity condition established between the magnet and holder via the PCB mounted sensor (such as which is understood further to be any suitable type of inductive or magnetic Hall effect sensor which is integrated into the interface established between the magnet holder 48 and the opposing PCB surface), the solenoid 72 is once again de-energized in order to permit the extending portion 72 to extend concurrent with the biasing force of the torsional spring 80 pushing the lock lever assembly 76 and crosswise supported lock plunger 90 to reengage the selected window 28 configured into the detent locking wheel 22.

In this manner, both the BTSI and return to park functionality are integrated into a simplified design consisting of a single solenoid, detent locking wheel, return torsional spring and interposed lock lever which are incorporated into the biased plunger housing subassembly and so that the plunger provides for normal shifting operation, with the detent locking wheel operating in combination with the solenoid and lock plunger to provide return to park functionality. Furthermore, the ability to utilize the auto return to park rotary shifter with the rotary end stopper disk, solenoid, and torsional spring (in contrast to the arrangement of multiple motors or solenoids associated with fixed position rotary shifters) provides a much more simplified and reliable design for ensuring a return to Park condition.

Summarizing the operating protocol of the present assembly, FIGS. 3-4 again illustrated the solenoid deactivated and with the lock lever assembly supported plunger in a fully engaged position within a selected window 28 of the detent locking wheel 22. In this position, the Park lock (BTSI) mechanism is engaged and the vehicle is locked in the Park position by virtue of the lock plunger 90 engaging both the detent locking wheel 22 through a selected perimeter extending window 28 and further engaging the abutment location (see at 29 in FIG. 5) of the plunger housing subassembly 30.

FIGS. 5-6 subsequently illustrate the solenoid 72 in an energized state in which the lock plunger 90, via the lock lever assembly 76 and the retracting force of the solenoid extension 74 overcomes the biasing forces of the spring 80, causing the plunger to be partially retracted out of contact with the stop location 29 of the inner rotatable supported plunger housing 30. The extending lip edge 106 of the lock plunger remains in engaging contact with the detent locking wheel window 28 such that, in normal shifting operation as depicted in FIGS. 7-8, the plunger housing subassembly 30 and slaved knob 12 are permitted to adjust the shifter between each of the PRND (and S) positions. In this condition, the return spring 31 is loaded between the detent locking wheel (transitioning leg 33) and housing (fixed leg 35) with transitioning between the shifter positions occurring as previously described. Due to the architecture of the package housing interior 14, the knob 12 is limited to rotation between the Park and Drive positions, with shifting effort generated by the bearings or balls (36) and the hidden springs incorporated into the radial projecting portions 32/34 of the plunger housing subassembly 30.

FIG. 9 further depicts the fully released position in which the lock plunger 90 is fully retracted from the associated engaging window 28 of the detent locking wheel 22 (again via cross pivoting along directional arrow 103 about pin axis 102 and against the tertiary holding force of the spring 105), such in response to the PCB 40 being notified by an external sensor of a reset condition (resulting again from arc rotation of the magnet 49 relative to the PCB mounted sensor) such as resulting from the driver preparing to exit the vehicle without having previously rotated the knob into the Park position. In this condition, the solenoid is powered to the on condition and the plunger fully retracted from the detent locking wheel 22 resulting in the torsion spring 31 (via opposite biasing legs 33 and 35) rotating the wheel 22 and supported knob 12 and plunger housing subassembly 30 to the Park position.

Finally, FIG. 10 is an illustration, generally at 110, of a lever style fixed position rotary shifter with auto return to park and park lock functionality. As compared to the knob style rotary shifter of FIGS. 1-9, the lever style package 110 operates in a functionally similar fashion and includes a shifter housing 112 (shown in split half shell with an open interior) and which, similar to the rotary knob package housing 14, includes an arcuate and substantially perimeter extending and supporting profile 114 which coaxially seats a reconfiguration of the detent locking wheel 116 including a plurality of perimeter spaced windows 118 configured therein.

A lock lever assembly 120 is provided which is pivotally supported (at location 122) within an adjacent interior location of the housing 112 outside of the support profile 114. A solenoid assembly 124 is supported within the housing 112 and includes an extensible end 126 which is pivotally slaved, at 128 to an arm 121 extending to the pivot location 122 of the lever assembly 120 and so that the arm 121 is angularly offset from the lock lever assembly 120.

As further shown, a portion of the lock lever assembly 120 extends from the intermediate pivotal support location 122 in a direction generally opposite from the solenoid slaved location 126 and terminates in a crosswise extending lock plunger 130. As with the prior embodiment, the lock plunger 130 can be supported in a crosswise pin rotating fashion, see at 132, and can also include any type of tertiary biasing spring (such as depicted at 105 in the preceding lock plunger 90 of FIG. 6) to maintain an extending portion of the plunger 130 into contact through the selected window 118 of the detent locking wheel.

A plunger housing subassembly 134 is rotatable supported within the detent locking wheel 116, the subassembly 134 being functionally similar to that previously described at 30 and including a pair of opposite radial extending wings or portions 136/138 relative to a center rotating axis 140 for supporting the subassembly 134 within the housing 112. The plunger housing subassembly includes a similar arrangement of spring biased balls or bearings (not shown) which are supported at open ends of the extending portions 136/138 and in order to provide iterative shifting between PRND positions.

A shifter lever 142 extends from a central receiving pocket 144 of the plunger housing subassembly 134 and through a slot configured into an upper edge of the shifter housing 112 (such as further established by mating halves of the housing) for accommodating each of the PRND positions. A return spring (a portion of which is shown at 146) is provided and operates under a similar principal as that depicted at 31 in the preceding embodiment for controlling controlled adjustment and return to park reset of the detent locking wheel 116 and supported shifter lever/plunger housing subassembly relative to the outer shifter housing 112.

Operation of the lever style shifter 110 operates under similar principles to the rotary knob style shifter 10, with the lock plunger 130 being in a fully engaged (solenoid de-energized) position in which the plunger extends through the detent locking wheel 116 and selected perimeter window 118 into an abutment engagement (substantially obscured) with the plunger housing subassembly 134. Initial energization of the solenoid 124 results in partial retraction of the extending portion 126 to partially pivot the lock plunger 130 out of engagement with the plunger housing subassembly 134, allowing normal shifting operation in which the subassembly 134 is permitted to pivot between the PRND positions relative to the fixed detent locking wheel 116.

A similar PCB, magnet and sensor arrangement (not shown) is provided in the lever style embodiment 110 and, upon triggering a reset event, instructs the solenoid 124 to fully retract the lock plunger 130 from the detent locking wheel 116, at which the return spring 146 biases the wheel 116 to rotate to a Park reset condition relative to the outer shifter housing 112. In this manner, the rotary knob variant of FIGS. 1-9 is reconfigured as a straight gate shifter as described in FIG. 10.

Having described our invention, other and additional embodiments will become apparent to those skilled in the art to which it pertains, and without deviating from the scope of the appended claims:

We claim:

1. A shifter assembly, comprising:
   a housing supporting a detent locking wheel;
   a return spring biasing said detent locking wheel in a rotational direction relative to said housing;
   a plunger housing subassembly rotatably supported within said detent locking wheel and operating in response to an external input to be rotated between each of Park, Reverse, Neutral and Drive gear shift positions;
   a solenoid supported by said housing and linked to a lock lever assembly pivotally engaged in said housing in proximity to said detent locking wheel, an extending portion of said lock lever assembly engaging said detent locking wheel;
   a PCB board integrated into said housing and communicable with at least one sensor associated with a driver exit condition; and
   upon a triggering of said exit condition with said shifter in other than a Park position, said solenoid being energized to retract said lock lever assembly to permit said return spring to rotate said wheel to the Park position.

2. The shifter assembly as described in claim 1, further comprising a Park lock function in which said lock lever assembly engages both said detent locking wheel and said plunger housing subassembly preventing shifting between gear positions.

3. The shifter assembly as described in claim 1, further comprising a lock plunger pivotally supported upon said lock lever assembly along a crosswise pivot supporting axis relative to said pivotal support location of said lock lever assembly to said housing.

4. The shifter assembly as described in claim 3, further comprising a secondary spring biasing said lock lever assembly in a direction towards said detent locking wheel.

5. The shifter assembly as described in claim 4, further comprising a tertiary spring biasing said lock plunger about said crosswise pivot supporting axis in a direction to engage a perimeter window location of said detent locking wheel, unseating of said lock plunger from said window occurring simultaneous with rotary return to park reset of said locking wheel as directed by said return spring.

6. The shifter as described in claim 1, further comprising a bezel cover applied over an open interior of said housing.

7. The shifter as described in claim 1, further comprising coaxially aligning contact locations associated with ramped underside perimeter portions upon said detent locking wheel surrounded by perimeter defined locations upon an underside of said housing, a first extending leg of said return spring slidably displacing along said ramped underside of said wheel, a second extending leg engaging a selected perimeter location of said housing.

8. The shifter as described in claim 1, further comprising said plunger housing having a pair of lower and opposite and radial projecting guiding portions, these being interiorly hollowed for receiving a pair of opposing steel balls and supporting detent springs.

9. The shifter as described in claim 8, further comprising at least one of a rotary knob or an elongated lever attached to said plunger housing, said radial projecting portions aligning with an inwardly facing detent profile associated with said detent locking wheel, said outwardly influenced steel balls supported within said open interior of said radial portions interacting in tactile induced fashion with said detent profile edges defined within said wheel surface to establish guided rotation of said knob.

10. The rotary shifter as described in claim 1, said driver exit condition further comprising a magnet and holder integrated into an underside of said plunger housing in proximity to said PCB board integrated into said housing, relative motion between a knob connected to said housing and an end stopper causing said magnet to rotate in an arc motion relative to a sensing component upon said PCB board.

11. The shifter as described in claim 1, further comprising a plurality of light pipes arranged within said housing so that bottom open ends are in communication with individual LED's integrated into said PCB board.

12. The rotary shifter as described in claim 11, said individual LED's further comprising pairs of LED's for providing each of backlighting and gear indication respectively for each shifter position.

13. A shifter assembly, comprising:
a housing supporting a detent locking wheel;
a return spring biasing said detent locking wheel in a rotational direction relative to said housing;
a plunger housing subassembly rotatably supported within said detent locking wheel and operating in response to an external input to be rotated between each of Park, Reverse, Neutral and Drive gear shift positions;
a solenoid supported by said housing and linked to a lock lever assembly pivotally engaged in said housing in proximity to said detent locking wheel, an extending portion of said lock lever assembly engaging said detent locking wheel;
a lock plunger pivotally supported upon said lock lever assembly along a crosswise pivot supporting axis relative to said pivotal support location of said lock lever assembly to said housing, a secondary spring biasing said lock lever assembly in a direction towards said detent locking wheel;
a PCB board integrated into said housing and communicable with at least one external sensor associated with a driver exit condition; and
upon a triggering of said exit condition with said shifter in other than a Park position, said solenoid being energized to retract said lock lever assembly to permit said return spring to rotate said wheel to the Park position.

14. The shifter assembly as described in claim 13, further comprising a Park lock function in which said lock lever assembly engages both said detent locking wheel and said plunger housing subassembly preventing shifting between gear positions.

15. The shifter assembly as described in claim 13, further comprising a tertiary spring biasing said lock plunger about said crosswise pivot supporting axis in a direction to engage a perimeter window location of said detent locking wheel, unseating of said lock plunger from said window occurring simultaneous with rotary return to park reset of said locking wheel as directed by said return spring.

16. The shifter as described in claim 13, further comprising coaxially aligning contact locations associated with ramped underside perimeter portions upon said detent locking wheel surrounded by perimeter defined locations upon an underside of said housing, a first extending leg of said return spring slidably displacing along said ramped underside of said wheel, a second extending leg engaging a selected perimeter location of said housing.

17. The shifter as described in claim 13, further comprising said plunger housing having a pair of lower and opposite and radial projecting guiding portions, these being interiorly hollowed for receiving a pair of opposing steel balls and supporting detent springs.

18. The shifter as described in claim 17, further comprising at least one of a rotary knob or an elongated lever attached to said plunger housing, said radial projecting portions aligning with an inwardly facing detent profile associated with said detent locking wheel, said outwardly influenced steel balls supported within said open interior of said radial portions interacting in tactile induced fashion with said detent profile edges defined within said wheel surface to establish guided rotation of said knob.

19. The rotary shifter as described in claim 13, said driver exit condition further comprising a magnet and holder integrated into an underside of said plunger housing in proximity to said PCB board integrated into said housing, relative motion between a knob connected to said housing and an end stopper causing said magnet holder to rotate in an arc motion relative to a sensing component upon said PCB board.

20. The shifter as described in claim 13, further comprising a plurality of light pipes arranged within said housing so that bottom open ends are in communication with individual pair of LED's integrated into said PCB board for providing each of backlighting and gear indication respectively for each shifter position.

21. A shifter assembly, comprising:
a housing supporting a detent locking wheel;
a return spring biasing said detent locking wheel in a rotational direction relative to said housing;
coaxially aligning contact locations associated with ramped underside perimeter portions upon said detent locking wheel surrounded by perimeter defined locations upon an underside of said housing, a first extending leg of said return spring slidably displacing along said ramped underside of said wheel, a second extending leg engaging a selected perimeter location of said housing;

a plunger housing subassembly rotatably supported within said detent locking wheel and operating in response to an external input to be rotated between each of Park, Reverse, Neutral and Drive gear shift positions;

a solenoid supported by said housing and linked to a lock lever assembly pivotally engaged in said housing in proximity to said detent locking wheel, an extending portion of said lock lever assembly engaging said detent locking wheel;

a PCB board integrated into said housing and communicable with at least one external sensor associated with a driver exit condition;

a magnet and holder integrated into an underside of said plunger housing subassembly in proximity to said PCB board, relative motion between a knob connected to said housing and an end stopper causing said magnet holder to rotate in an arc motion relative to a sensing component upon said PCB board; and upon a triggering of said exit condition with said shifter in other than a Park position, said solenoid being energized to retract said lock lever assembly to permit said return spring to rotate said wheel to the Park position.

* * * * *